United States Patent [19]

Williams et al.

[11] Patent Number: 5,693,731
[45] Date of Patent: Dec. 2, 1997

[54] POLYMERIZATION OF DICYCLOPENTADIENE

[75] Inventors: Theodore J. Williams; John J. Schmid, both of Panama City, Fla.

[73] Assignee: Arizona Chemical Company, Panama City, Fla.

[21] Appl. No.: 614,662

[22] Filed: Mar. 13, 1996

Related U.S. Application Data

[60] Continuation-in-part of Ser. No. 353,729, Dec. 12, 1994, abandoned, which is a division of Ser. No. 185,057, Jan. 24, 1994, Pat. No. 5,410,004.

[51] Int. Cl.$^6$ ..................................................... C08F 36/04
[52] U.S. Cl. ........................... 526/224; 525/384; 526/222; 526/223; 526/283; 526/317.1; 526/319
[58] Field of Search .................................. 526/283, 222, 526/223, 224

[56] References Cited

U.S. PATENT DOCUMENTS

| | | |
|---|---|---|
| 2,598,424 | 5/1952 | Peters. |
| 3,084,147 | 4/1963 | Wilks. |
| 4,976,783 | 12/1990 | Werner ..................................... 106/20 |
| 5,410,004 | 4/1995 | Williams ................................. 526/237 |

*Primary Examiner*—Fred Zitomer
*Attorney, Agent, or Firm*—Luedeka, Neely & Graham, P.C.

[57] ABSTRACT

The specification discloses a method for making DCPD based resins that have essentially unimodal molecular weight distributions. The method comprises polymerizing dicyclopentadiene monomer in the presence of an organic sulfur compound which is effective to control the molecular weight distribution of the polymerized product. For end-use performance in inks, adhesives, coatings and other related areas, the invention provides dicyclopentadiene based resins having molecular weight distributions which effectively enhance the resin solubility and compatability in various formulations.

16 Claims, 11 Drawing Sheets

POLYMERIZATION OF DICYCLOPENTADIENE

This application is a continuation-in-part of application Ser. No. 08/353,729 filed on Dec. 12, 1994, now abandoned which is a division of application Ser. No. 08/185,057, filed Jan. 24, 1994, now U.S. Pat. No. 5,410,004, issued Apr. 25, 1995.

FIELD OF THE INVENTION

The present invention relates to an improved method for polymerizing cyclopentadiene and/or dicyclopentadiene monomer and the resins produced by such polymerization. More specifically, the present invention relates to a thermal polymerization process whereby an essentially unimodal molecular weight distribution of dicyclopentadiene resin is obtained.

BACKGROUND OF THE INVENTION

The thermal polymerization of dicyclopentadiene (DCPD) and modified DCPD monomer is a common practice for the preparation of ink, adhesive and coating resins. The major advantage of using DCPD for these resins is its relatively low cost. A major drawback to these resins, however, is the presence of high molecular weight fractions in the polymerized DCPD resin. The high molecular weight fractions may tend to reduce the solubility and compatibility of the resins in many applications.

The addition of significant levels (50% or more) of vinyl aromatics or other reactive species (which are relatively expensive) and the use of shorter duration polymerization reactions may be used to minimize the formation of higher molecular weight fractions in the product. However, the yield of resin using these techniques is low and the cost of the raw materials added to reduce the amount of higher molecular weight fractions is relatively high.

Therefore, it is an object of the invention to provide an improved DCPD resin.

It is another object of the invention to provide a DCPD resin having an essentially unimodal molecular weight distribution.

A further object of the invention is to provide a DCPD resin which is essentially free of high molecular weight fractions which tend to reduce the solubility and compatibility of the resin in adhesive and ink formulations.

Still another object of the invention is to provide a method for producing a DCPD or modified DCPD resin by thermal polymerization whereby a resin having an essentially unimodal molecular weight distribution is produced.

It is another object of the present invention to provide adhesives and ink varnishes from the DCPD resins of the invention.

These and other objects, advantages, and features of the invention will be evident from the following discussion and appended claims.

SUMMARY OF THE INVENTION

The present invention provides a method for producing dicyclopentadiene (DCPD) resin. The method comprises reacting cyclopentadiene and/or dicyclopentadiene monomer in a reaction vessel at a temperature in the range of from about 240° to about 340° C. in the presence of from about 1 to about 10 wt. % of an organic sulfur compound to provide a resin having an essentially unimodal molecular weight distribution. Preferably, the organic sulfur compound is selected from those organic sulfur compounds wherein the onset of significant thermal disassociation occurs at a temperature above about 70° C. The reaction may also be conducted in the presence of an olefinic modifier compound to further control the molecular weight distribution of the resulting resin product.

A particular advantage of the process of the invention is that the resulting polymeric resin has an essentially unimodal molecular weight distribution. Such unimodal molecular weight distribution generally enhances the solubility and compatibility of the resulting DCPD resin in adhesives, solvents and ink formulations containing the resin.

Furthermore, DCPD resins produced according to the present invention have a molecular weight distribution which is relatively narrow. The narrow molecular weight distribution, coupled with the relatively low molecular weight, leads to an increased compatibility of the resins of the present invention with the elastomers, solvents, gelling agents, etc., of commercially important adhesives, ink varnishes and coatings. Thus, the present resins of the invention have improved characteristics over many other DCPD resins, particularly resins prepared in the absence of organic sulfur compounds.

In another embodiment, the present invention provides adhesive compounds, coatings, ink varnishes, and gelled varnishes containing a dicyclopentadiene resin made according to the invention.

BRIEF DESCRIPTION OF THE DRAWINGS

Various embodiments of the invention will now be described in further detail in the following specification in conjunction with the accompanying drawings in which.

DETAILED DESCRIPTION OF THE INVENTION

Figure 1A:
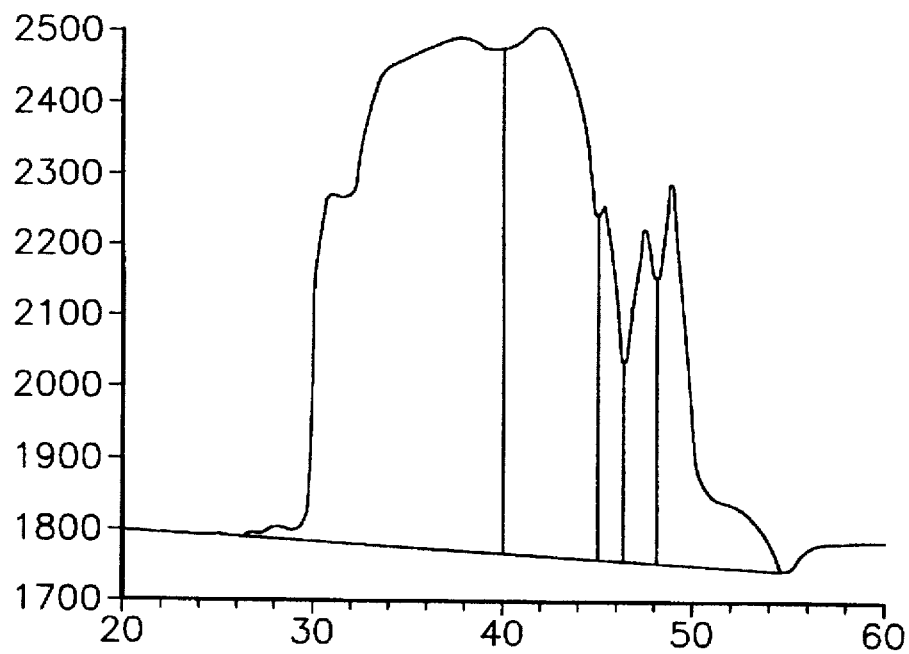
FIGS. 1A, 2A, 3A 4A, 5A, 7A and 8A are gel permeation chromatography (GPC) traces for dicyclopentadiene resins prepared according to polymerization techniques not of the present invention.

The present invention provides a method for producing an improved DCPD resin. In the method, cyclopentadiene and/or dicyclopentadiene monomer is polymerized in a reaction vessel in the presence of an organic sulfur compound. Conducting the reaction in the presence of an organic sulfur compound has been found to promote the thermal polymerization of the monomer to a resin having an essentially unimodal molecular weight distribution. It has also been found that the thermal disassociation characteristics of the sulfur compound may impact on its effectiveness in this application. It is especially preferred that the organic sulfur compound be selected from the class consisting of organic sulfur compounds wherein the onset of significant thermal disassociation occurs at a temperature above about 70° C.

DCPD resin prepared by the process according to the invention is more compatible with many of the elastomers, solvents, gelling agents, etc., which are used in adhesives, ink varnishes and coatings due to its narrow molecular weight distribution coupled with its relatively low molecular weight. Furthermore, a high yield of DCPD resin having the foregoing molecular weight distribution may be obtained without the need for elaborate purification of the reaction product. Accordingly, there is less need for stripping the DCPD reaction product of unreacted modifiers and low molecular weight oligomers.

It is preferred that the starting material or reaction mixture contain a minimum of 40 wt. % dicyclopentadiene (DCPD) monomer. Inexpensive commercially available DCPD concentrates typically contain a minor amount of cyclopentadiene (CPD), usually about 1 wt. % CPD, which readily redimerizes to DCPD at ambient temperatures. Accordingly, a more preferred DCPD monomer contains from about 50 wt. % to about 90 wt. % DCPD, although the very high purity DCPD blended with an olefinic modifier compound will also function well.

To generate the lightest final resin color, it is preferred that the DCPD stream be substantially clear, bright and colorless. Dark colored streams do not generally afford light final resin colors, but the molecular weight controlling effect of the present invention is not generally affected by the starting material's initial color.

Organic sulfur compounds which may be used include, but are not limited to, substituted phenol polysulfides, aliphatic mercaptans, aromatic mercaptans and aliphatic/ aromatic or mixed sulfides which promote the thermal polymerization of DCPD. Again, it is preferred that the organic sulfur compounds exhibit certain thermal properties, in particular it is preferred that the onset of any significant thermal disassociation of the compound occurs at a temperature above about 70° C. Preferred organic sulfur compounds are selected from the group consisting of isopropyl mercaptan, thiophenol, thiosalicylic acid, 2,6-tert-butylphenol-4-thiol, phenyldisulfide, nonylphenol disulfide oligomer, di-(3,5-tert-butylphen-3-ol)disulfide, thiobis-β-naphthol, di-(3,5-tert-butylphen-3-ol)disulfide, di-(3,5-tert-butylphen-3-ol)trisulfide, and di-(3,5-tert-butylphen-3-ol) tetrasulfide and mixtures of two or more of the foregoing organic sulfides. Of the preferred organic sulfur compounds, commercially available species include the phenolic poly-or disulfide products sold under the trade names ETHANOX 323 (Albermarle Corporation of Richmond, Va.), VULTAC 2 (ELF Atochem North America of Philadelphia, Pa.) and SANTOWHITE CRYSTALS (Monsanto Company of St. Louis, Mo.).

Although the organic sulfur compounds may be effective when used alone in the polymerization process, mixtures of the compounds are also suitable for preparing the DCPD resin with good color and essentially unimodal molecular weight distribution. For example, a mixture of di-3,5-tert-butylphen-3-ol disulfide, di-3,5-tert-butyl-3-ol trisulfide, and di-3,5-tert-butyl-3-ol tetrasulfide, alone or in combination with an olefinic modifier compound may be used to prepare the DCPD resin of the invention.

At concentrations below about 1 wt. %, the organic sulfur compound may be less effective for controlling the molecular weight distribution of the polymerization reaction. Concentrations of the organic sulfur compound much higher than about 10 wt. % may not substantially improve the molecular weight distribution of the polymerization over concentrations of the organic sulfur compound at about 10 wt. % or below. Accordingly, the amount of the organic sulfur compound used in the polymerization process may range from about 0.5 to about 15 wt. %, preferably from about 0.75 to about 12 wt. % and most preferably from about 1 to about 10 wt. % based on the total weight of cyclopentadiene and/or dicyclopentadiene monomer and sulfur compound present in the reaction mixture.

The olefinic modifier compound, which may be admixed with the cyclopentadiene and/or dicyclopentadiene monomer and organic sulfur compound, is preferably selected from the group consisting of ethylene, propylene, styrene, α-methyl styrene, indene, 1,3-pentadiene, isobutylene, isoprene, piperylene, 1-butene, 1-hexene, 1-octene, limonene, α-pinene, β-pinene, acrylic acid, methyl methacrylate, butadiene, and mixtures of those olefins. In general the amount of olefinic modifier compound used will not exceed about 40 wt. % of the total reaction mixture and will typically be within the range of from about 0 to about 35 wt. % of the total reaction mixture.

In another embodiment, the invention provides a method for polymerizing cyclopentadiene and/or dicyclopentadiene monomer to form a dicyclopentadiene resin. The method comprises mixing from about 90 to about 99 wt. % cyclopentadiene and/or dicyclopentadiene monomer with from about 1 to about 10 wt. % of an organic sulfur compound selected from one or more of the organic sulfur compounds described above to provide a reaction mixture. The reaction mixture is then placed in a reaction vessel capable of being sealed and pressurized. A suitable reaction vessel is an autoclave having the capability to withstand the temperatures and pressures of the reaction. After placing the reactants in the reaction vessel, it is preferred that the vessel be purged with an inert gas such as nitrogen prior to conducting the reaction in order to reduce oxidation of the reactants and product. Next the reaction mixture is heated to a temperature in the range of from about 240° to about 340° C. The foregoing reaction temperature is maintained for a period of time sufficient to thermally polymerize essentially all of the cyclopentadiene and/or dicyclopentadiene monomer wherein a dicyclopentadiene resin having an essentially unimodal molecular weight distribution is produced.

Reaction times may range from about 1 to about 40 hours, preferably from about 4 to about 20 hours. During the reaction, the pressure in the reaction vessel will typically be above atmospheric pressure. Accordingly, the reaction is generally conducted in a closed pressure vessel under a nitrogen or inert gas atmosphere.

After the high temperature polymerization reaction is complete, the crude reaction product is worked up. The work-up consists of standard physical distillation and stripping operations at temperatures designed to be somewhat below the reaction temperature. The objective of the stripping operation is to remove inert solvent, unreacted monomer, modifiers and reaction product oils.

In order to recover the polymerized resin from the reaction mass, the temperature of the reaction mass is first decreased to within a range of from about 220° C. to about 260° C. while maintaining the reaction mass containing the resin product under an inert gas atmosphere. Next the reaction mass is subjected to sparging with steam or an inert gas such as nitrogen or argon over a period of time in the range of from about 45 minutes to about 75 minutes while maintaining the reaction product temperature in the range of from about 220° C. to about 260° C. Sparging is continued until a resin softening point in the range of from about 90° C. to about 140° C. is obtained. Sparging of the reaction product may be conducted in the reaction vessel or, preferably, the reaction product is transferred to a sparging vessel after polymerization. It is preferred to maintain the reaction product under inert gas atmosphere during the transfer and sparging operations.

As a result of the use of the process according to the invention, a dicyclopentadiene resin having a relatively narrow molecular weight distribution may be produced. The resin has a z average molecular weight in the range of from about 1.6 to about 2.3 times the weight average molecular weight of the resin, and in the range of from about 2.5 and about 4.2 times the number average molecular weight of the resin. In addition, the resin of the present invention has a ring and ball softening point in the range of from about 90° C. to about 140° C., and a cloud point in the range of from about 65° C. and about 80° C. and a sulfur content within the range of from about 0.1 wt. % to about 3.0 wt. %.

As used herein, the molecular weight distribution is a measure of the range of molecular weights within a given polymeric sample. It is characterized in terms of at least one of the ratios of z average molecular weight to weight average molecular weight, $M_z/M_w$, and z average molecular weight to number average molecular weight, $M_z/M_n$, where $M_z = (\Sigma N_i M_i^3)/(\Sigma N_i M_i^2)$, $M_w = (\Sigma N_i M_i^2)/(\Sigma N_i M_i)$, and $M_n = (\Sigma N_i M_i)/(\Sigma N_i)$, wherein $N_i$ is the number of molecules of molecular weight $M_i$.

As can be seen from the equations, the z average molecular weight emphasizes the higher molecular weight fractions of the polymeric sample. Thus, a sample with a relatively high $M_z$ would indicate the presence of molecules in the sample with high molecular weights.

The ratios of $M_z$ to $M_w$ and $M_z$ to $M_n$ give an indication of the limits of the molecular weight distribution. Relatively low ratios (less than about 2.5 for the $M_z$ to $M_w$ ratio and less than about 4.2 for the $M_z$ to $M_n$ ratio) indicate a narrow distribution of molecular weights where relatively high ratios (greater than about 2.6 for the $M_z$ to $M_w$ ratio and greater than about 4.5 for the $M_z$ to $M_n$ ratio) indicate a broad distribution of molecular weights. For the greatest compatibility of resin with various ingredients in an adhesive or varnish formulation, it is preferred that the $M_z$ to $M_w$ ratio be within the range of from about 1.6:1 to about 2.3:1 and the $M_z$ to $M_n$ ratio be within the range of from about 2.5:1 to about 4.2:1.

The molecular weight distribution of the resin may be determined by gel permeation chromatography (GPC) of the resin products. Resins with narrow molecular weight distributions show generally unimodal GPC traces. On the other hand, resins with broader molecular weight distributions will typically have multimodal GPC traces. The presence of high molecular weight fractions along with low molecular weight fractions will be evident from the multimodal trace.

DCPD resins prepared by traditional process are distinctly multimodal whereas the resins prepared according to the present invention are substantially unimodal. This fact may be demonstrated by comparing the GPC traces for DCPD resins prepared without using an organic sulfur compound and prepared using an organic sulfur compound believed to significantly decompose at a temperature below about 70° C. with a GPC trace for a DCPD resin prepared using an organic sulfur compound believed to begin to significantly decompose at a temperature above about 70° C.

Once formed the DCPD resin may be formulated with various components to form adhesives, coatings, gelled varnishes, ink varnishes, and the like. In a polymerization process where the DCPD resin is prepared by copolymerizing the DCPD monomer with acrylic acid or methyl methacrylate, the copolymerized resin may be further reacted with a polyol in an esterification step. During the esterification process, at least a portion of the water formed during the esterification step may be retained in the vessel to limit the extent of esterification in accordance with the procedure described in copending application Ser. No. 08/396,530, filed Mar. 1,1995, incorporated herein by reference as if fully set forth.

In an adhesive formulation, the resin may be admixed with an elastomer, a mineral oil and, perhaps, a tackifier. It has been found that the DCPD resins prepared by the methods of the invention are more compatible with the components of adhesives than resins of the prior art. In addition, adhesives prepared with resins of the present invention perform substantially as well as adhesives prepared with resins of the prior art.

Pressure sensitive adhesives prepared from the DCPD resins of the invention generally contain from about 20 to about 30 wt. % of an elastomeric component such as a block copolymer thermoplastic elastomer, from about 45 to about 65 wt. % of DCPD resin and, optionally, from about 15 to about 25 wt. % of a mineral oil, such as KAYDOL 550 P. O. (commercially available from Witco of Greenwich, Conn.) and/or a co-tackifier resin.

Elastomeric components which may be used to make the pressure sensitive adhesives include the block copolymers containing homopolystyrene blocks or segments, "A-blocks," and a hydrocarbon segment, "B-block," resulting in an A-B-A block structure. The styrene content may vary as well as the hydrocarbon segment placement. Typically, the hydrocarbon segment is derived from isoprene, butadiene, hydrogenated butadiene or combinations of these or other hydrocarbon monomers. In addition to a linear configuration, the hydrocarbon segments may have branched or radial configurations. A myriad of different products are commercially available and their specific uses are highly dependent on the application requirements.

Hot-melt adhesives generally contain ethylene and ethylenically unsaturated ester based elastomers, formulated with one or more resins (tackifiers), waxes and/or oils. Examples of such elastomers include, but are not limited to, ethylene-vinyl acetate (EVA) copolymers and ethylene-acrylate copolymers.

The co-tackifier resin component may be a hydrocarbon resin, a terpene resin or a rosin resin. The tackifier resin affords the tack properties needed for the bond formation process. Accordingly, the co-tackifier resin component must have good compatibility with the DCPD resins of the invention.

Hot melt adhesives which may be produced using the DCPD resins of the invention are generally composed of ethylene and ethylenically unsaturated ester based elastomers, formulated with one or more tackifier resins, waxes and/or oils. Elastomers which may be used in the hot melt-adhesive formulations include resin, ethylene-acrylate copolymers, ethylene-vinyl acetate (EVA) copolymers, and the like.

When used in an ink varnish composition, the DCPD resin of the present invention is substantially compatible with the gellants and solvents that are traditionally used in such formulations. Accordingly, the varnish prepared with a resin of the present invention shows excellent pigment flushing results when compared to commercially available varnishes. In addition, an ink varnish prepared with the present resin shows substantially acceptable tack, ink gloss, print density, misting, set-off and heat drying capacity.

Gelled varnishes for use in the preparation of ink formulations can be prepared from the DCPD resins of the invention. The varnish may comprise a gelling agent, a hydrocarbon solvent, and the dicyclopentadiene resin of the invention having a relatively narrow molecular weight distribution. A preferred gelled varnish has a gelling agent selected from the group consisting of aluminum diisopropoxide acetoacetic ester chelate and oxyaluminum octoate. It is also preferred that the gelling agent be present at a concentration of from about 1 wt. % to about 10 wt. %, the hydrocarbon solvent be present at a concentration in the range of between about 50 wt. % to about 80 wt. %, and the dicyclopentadiene resin be present at a concentration of between about 15 wt. % and about 10 wt. %. Suitable hydrocarbon solvents include MAGIESOL 47 commercially available from Magie Brothers Chemical Co./Pennzoil and the like.

Not all varnishes for use in ink formulations require that the resin be gelled. Accordingly, the invention also provides a varnish for use in the preparation of inks comprising a hydrocarbon solvent selected from MAGIESOL 470 and MAGIESOL 4700 and the dicyclopentadiene resin of the invention having a relatively narrow molecular weight distribution. In a preferred varnish composition, the hydrocarbon solvent is present at a concentration in the range of between about 50 wt. % to about 80 wt. %, and the dicyclopentadiene resin is present at a concentration of from about 50 wt. % and about 20 wt. %.

Thus, the commercial uses for resins produced according to the present invention include, but are not limited to, adhesives, ink formulations and varnish formulations. The resins of the invention may also be used as "green tack" promoters in rubber processing for improving the properties and handling characteristics of the rubber prior to vulcanization.

The following examples illustrate various aspects of the invention without intending to limit the invention in any way.

EXAMPLE 1

In this example, the reactants were pre-mixed and sealed in a pressure reactor and heated to a temperature of 260° C for a period of four hours. When the reaction was substantially complete, the temperature was lowered to a point that permitted the DCPD resin to be discharged from the reaction vessel in a molten state. Upon cooling, the resin was sampled for a measurement of molecular weight distribution (MWD) by gel permeation chromatography (GPC).

The first sample of resin prepared was a control sample of DCPD concentrate (DCPD 101 from Lyondell Petrochemical Co. of Texas containing 85 wt. % DCPD) without the use of catalyst or an organic sulfur compound. The resin produced from the control sample had a Gardner color of 6+ and a ring and ball softening point of 102.7° C. The GPC trace of the control resin is shown in FIG. 1A.

Figure 1B:
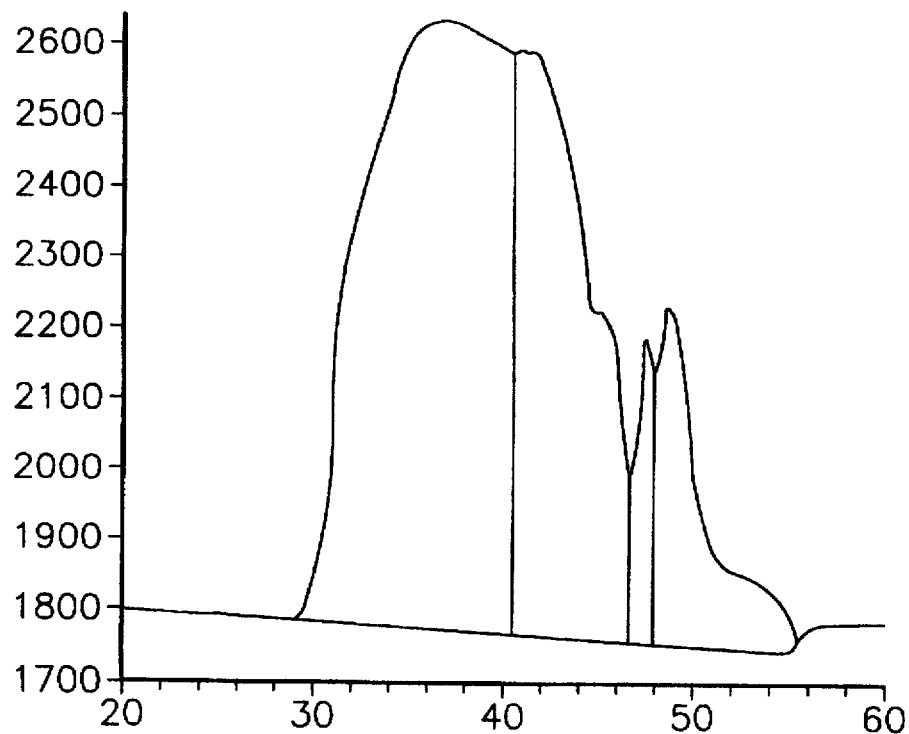
FIGS. 1B, 2B, 2C, 3B, 4B, 5B, 6, 7B, 7C, 8B, 8C, 8D, 9A and 9B are gel permeation chromatography (GPC) traces for a dicyclopentadiene resin prepared using the polymerization technique of the present invention.

A second DCPD resin was prepared using 100 parts DCPD concentrate (DCPD 101 from Lyondell Petrochemical Co. containing 85 wt. % DCPD) and 1 part alkyl-phenol polysulfide (VULTAC 2, from Elf Atochem North America). The polymerized resin of the present invention had a Gardner color of 7+ and a ring and ball softening point of 107.0° C. The GPC trace of the resin of the present invention is shown in FIG. 1B. From a comparison of FIG. 1A with FIG. 1B, it can be seen that the addition of the alkylphenol polysulfide to the second resin reaction mixture eliminated the high molecular weight shoulder that is characteristic of a straight DCPD resin polymerization.

EXAMPLE 2

Figure 2A:
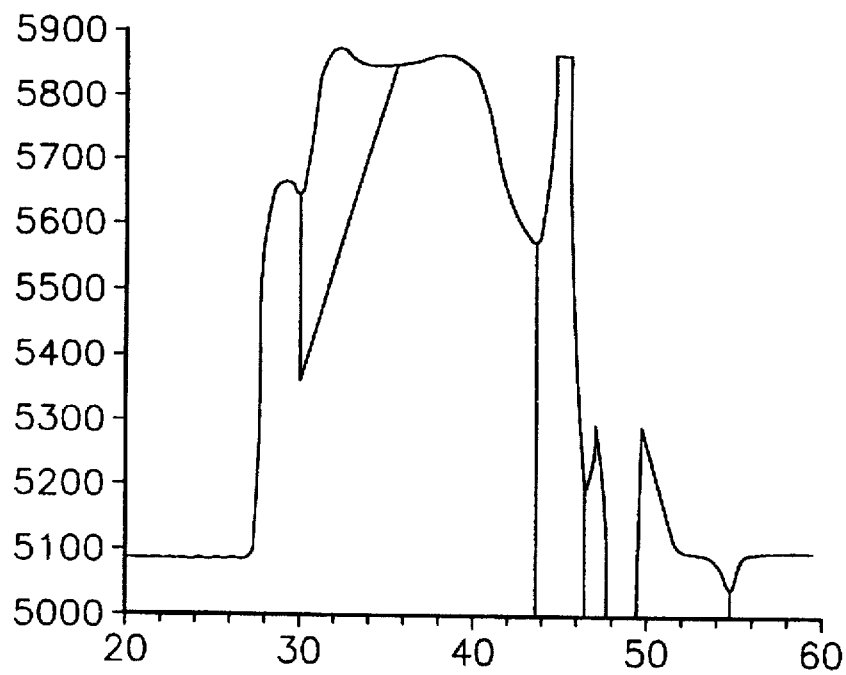
Figure 2B:
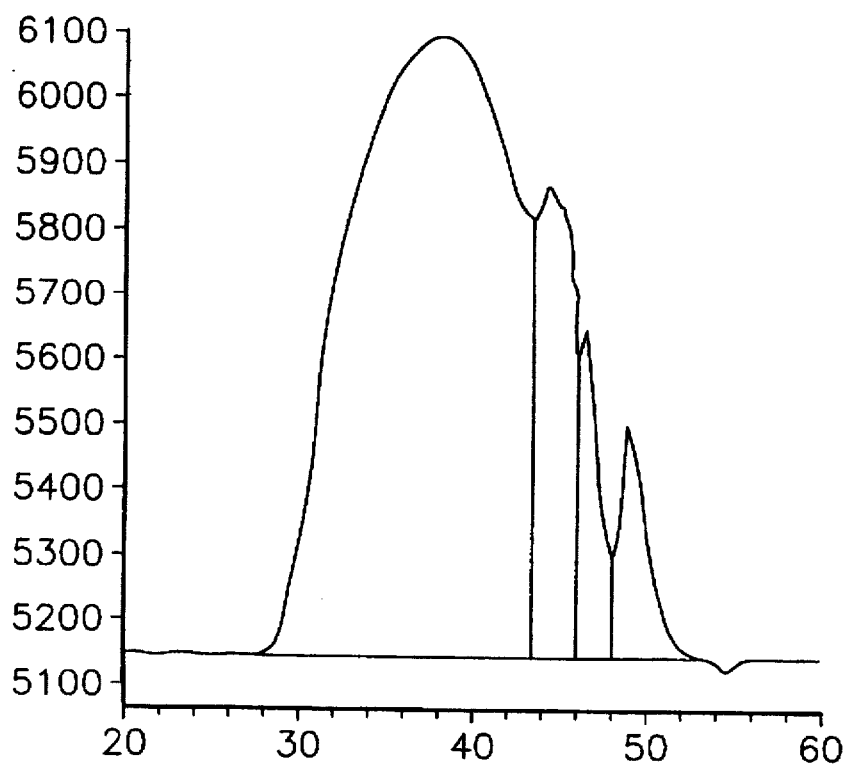
Figure 2C:
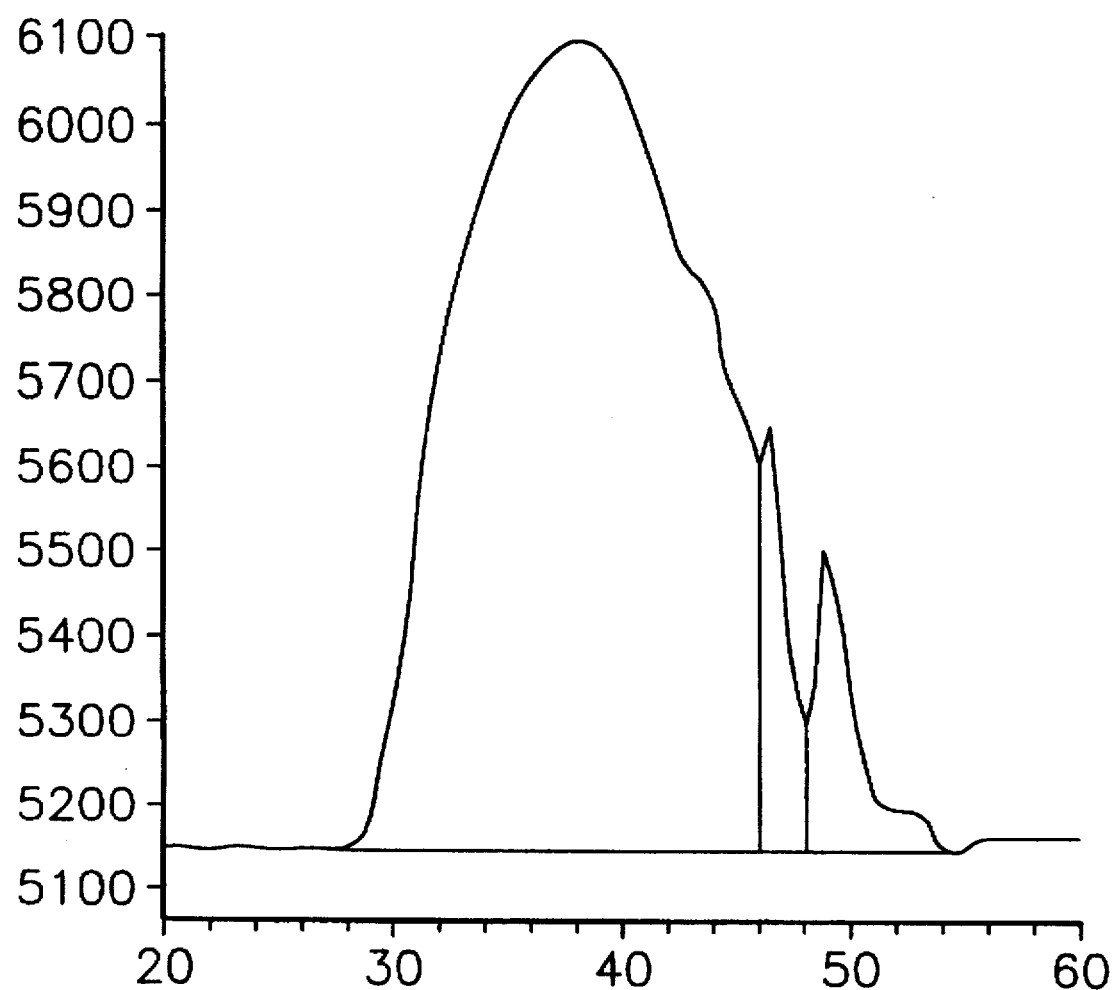

In accordance with the procedure set forth in Example 1, a control sample resin was prepared from DCPD concentrate (RO 60 from Dow Chemical Co. of Freeport, Tx. containing 60 wt. % DCPD). The GPC trace of the control resin is shown in FIG. 2A. A second resin was prepared according to the present invention using 100 parts DCPD concentrate (RO 60 from Dow Chemical Co.) and 2 parts thiophenol. The GPC trace of the second resin is shown in FIG. 2B. A third resin was prepared according to the present invention using 100 parts DCPD concentrate (RO 60 from Dow Chemical Co.) and 2 parts phenyldisulfide. The GPC trace of the third resin is shown in FIG. 2C.

As illustrated by FIG. 2A, the control resin had a multimodal molecular weight distribution. Each of the resins prepared with the organic sulfur compounds had substantially unimodal or normal bell-shaped (Gaussian) molecular weight distributions (FIGS. 2B and 2C) when compared with the molecular weight distribution of the control resin (FIG. 2A) which had a substantially multimodal molecular weight distribution.

EXAMPLE 3

Figure 3A:
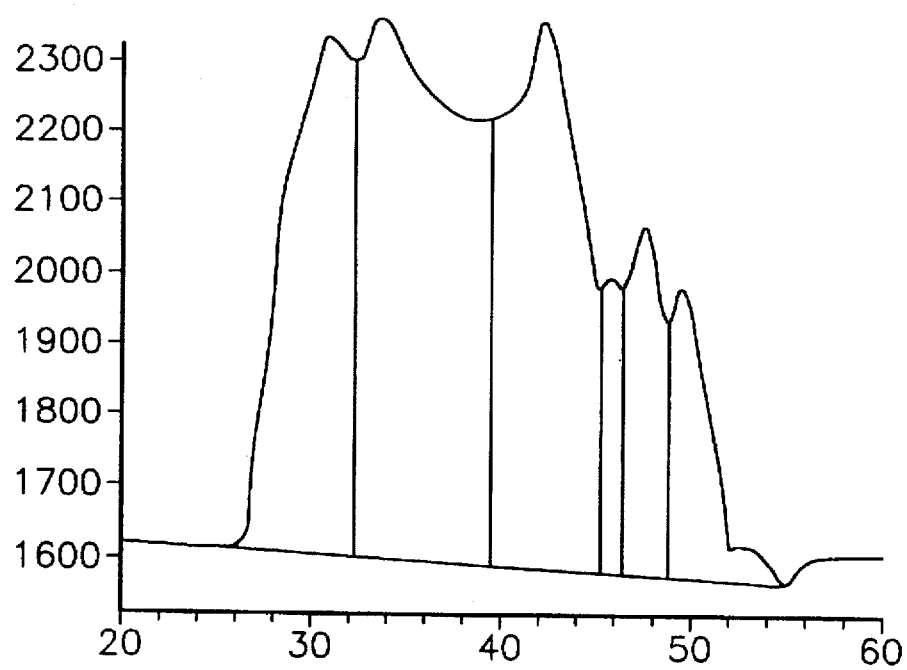
Figure 3B:
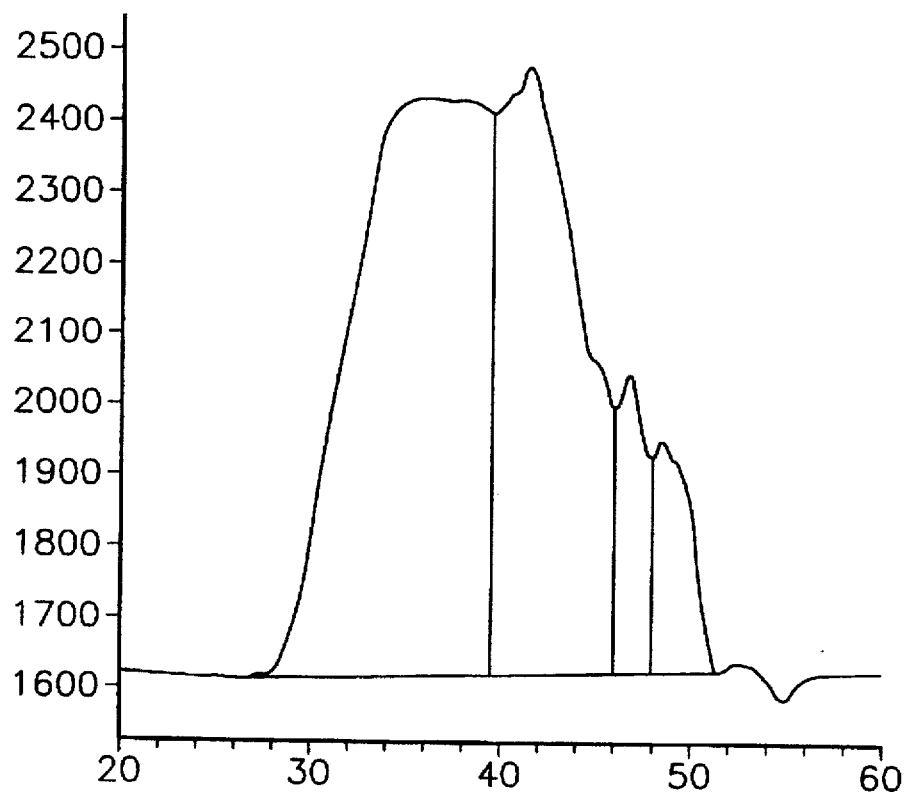

In accordance with the procedure set forth in Example 1, a control resin was prepared from a mixture of 70 parts of a DCPD concentrate (DCPD 101 from Lyondell Petrochemical Co.) and 30 parts styrene. A second resin was prepared according to the present invention from a mixture of 70 parts of a DCPD concentrate (DCPD 101 from Lyondell Petrochemical Co.), 30 parts styrene and 1.2 wt. % of an alkyl phenol polysulfide (VULTAC 2). The control resin had a neat Gardner color of 9 and a ring and ball softening point of 69.5° C. The GPC trace of the control resin is shown in FIG. 3A. The second resin had a neat Gardner color of 9+ and a ring and ball softening point of 45.0° C. The GPC trace of the second resin is shown in FIG. 3B. The molecular weight distribution of the control resin, as seen in FIG. 3A, is substantially multimodal. However, the addition of the alkyl phenyl sulfide to the second resin substantially reduced the multimodal components of the molecular weight distribution, as is seen in FIG. 3B.

EXAMPLE 4

Figure 4A:
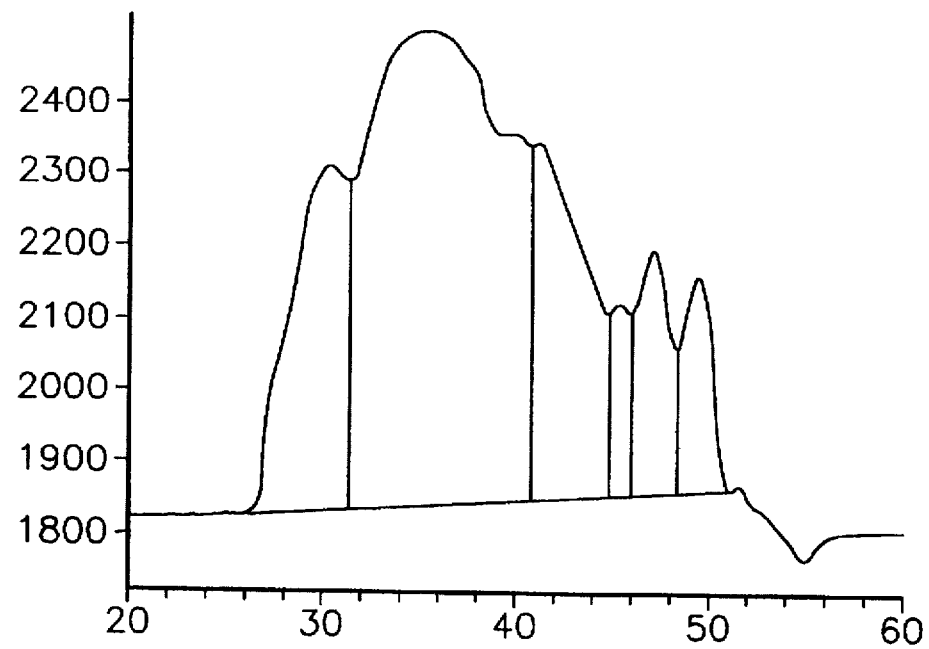
Figure 4B:
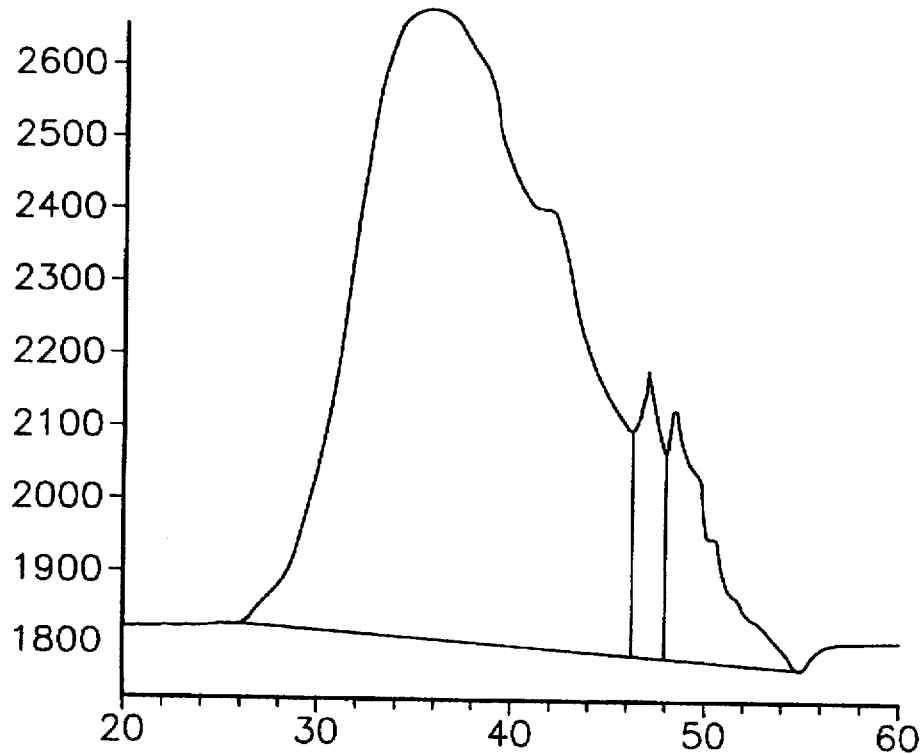

In accordance with the procedure set forth in Example 1, a control resin was prepared from a mixture of 90 parts of a DCPD concentrate (DCPD 101 from Lyondell Petrochemical Co.) and 10 parts acrylic acid. A second resin was prepared according to the present invention from a mixture of 90 parts of a DCPD concentrate (DCPD 101 from Lyondell Petrochemical Co.), 10 parts acrylic acid and 2 parts of an alkyl phenol polysulfide (VULTAC 2). The GPC trace of the control resin is shown in FIG. 4A. The GPC trace of the second resin is shown in FIG. 4B. The molecular weight distribution of the control resin, as seen in FIG. 4A, is substantially multimodal. However, the addition of the alkyl phenyl sulfide to the second resin substantially reduced the multimodal components to produce an essentially unimodal molecular weight distribution, as is seen in FIG. 4B.

EXAMPLE 5

Figure 5A:
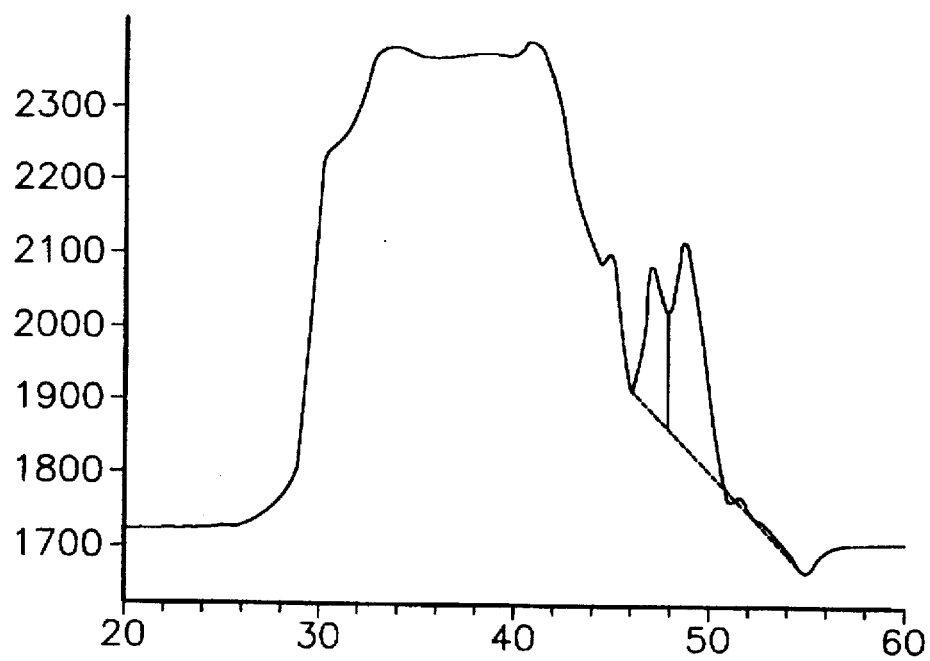
Figure 5B:
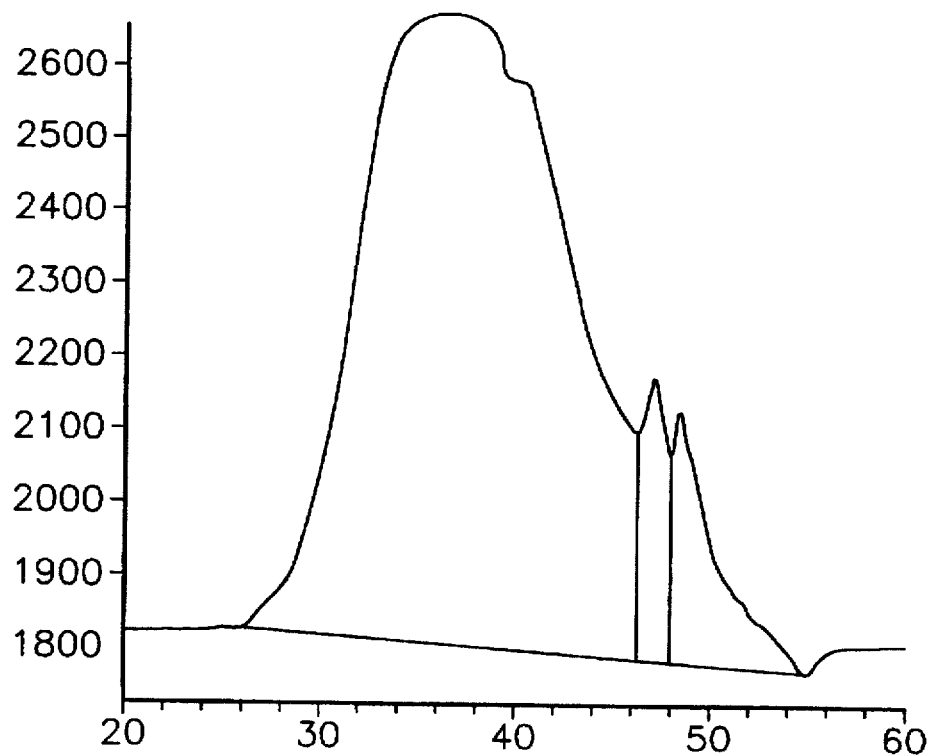

In accordance with the procedure set forth in Example 1, a control resin was prepared from a mixture of 90 parts of a DCPD concentrate (DCPD 101 from Lyondell Petrochemical Co.) and 10 parts methylmethacrylate. A second resin was prepared according to the present invention from a mixture of 90 parts of DCPD concentrate (DCPD 101 from Lyondell Petrochemical Co.), 10 parts methylmethacrylate and 2 parts of an alkyl phenol polysulfide (VULTAC 2). The GPC trace of the control resin is shown in FIG. 5A. The GPC trace of the second resin is shown in FIG. 5B. The molecular weight distribution of the control resin, as seen in FIG. 5A, is substantially multimodal. As illustrated in FIG. 5B, the addition of the alkyl phenyl sulfide to the second resin substantially reduced the multimodal components to produce an essentially unimodal molecular weight distribution for the DCPD resin of the invention.

EXAMPLE 6

Figure 6:
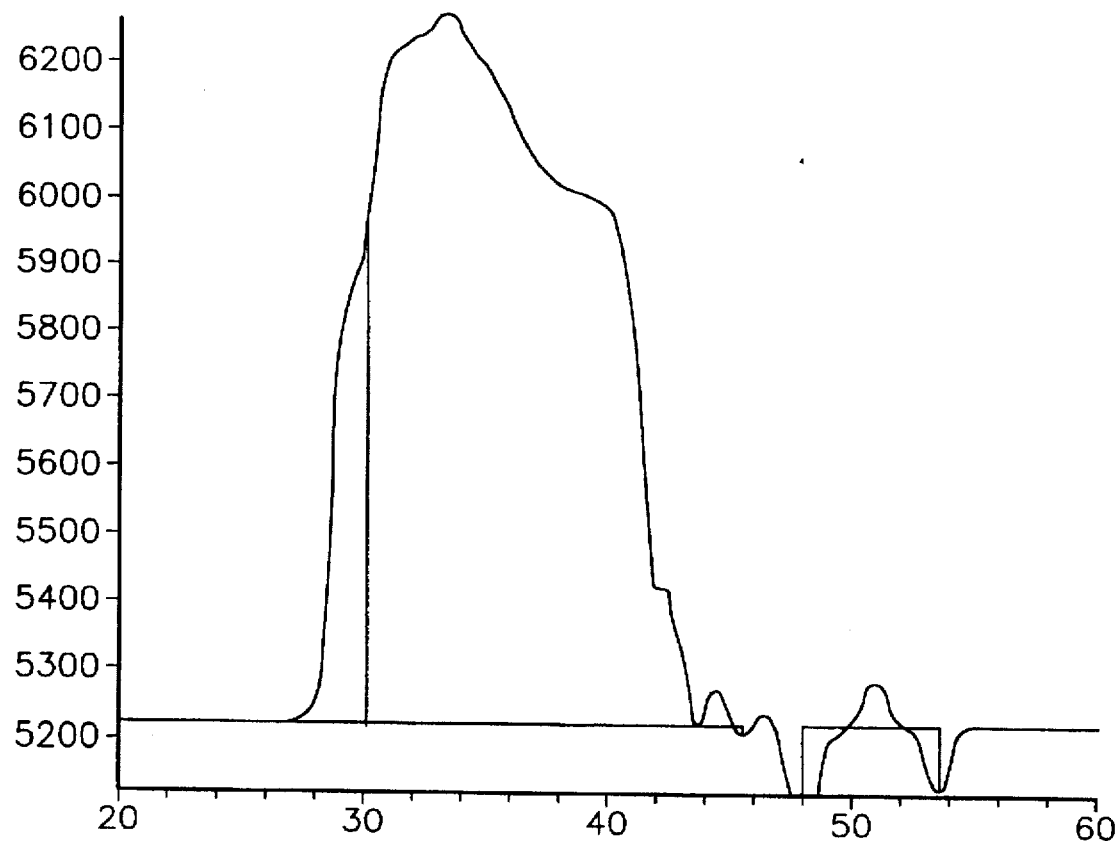

In accordance with the procedure set forth in Example 1, a resin was prepared according to the present invention from a mixture of 77.5 parts of DCPD concentrate (DCPD 101 from Lyondell Petrochemical Co.), 22.5 parts piperylene concentrate (from Shell Chemical Co.) and 1 wt. % of a nonylphenol disulfide oligomer (ETHANOX 323). The resin had a neat Gardner color of 7/7+ and a ring and ball softening point of 134.9° C. The resin had a stripped yield of 79.5%. The GPC trace of the resin is shown in FIG. 6 indicating that the resulting resin had a substantially unimodal molecular weight distribution.

EXAMPLE 7

In this example, premixed reactants were mixed and sealed in a pressure reactor. The reacts were heated to a temperature of 260° C. for a period of four hours. The temperature was then lowered to 210° C. to permit the resin to be discharged from the reaction vessel in a molten state into a collection vessel. Upon cooling, the resin was sampled for a measurement of molecular weight distribution (MWD) by gel permeation chromatography (GPC).

Figure 7A:
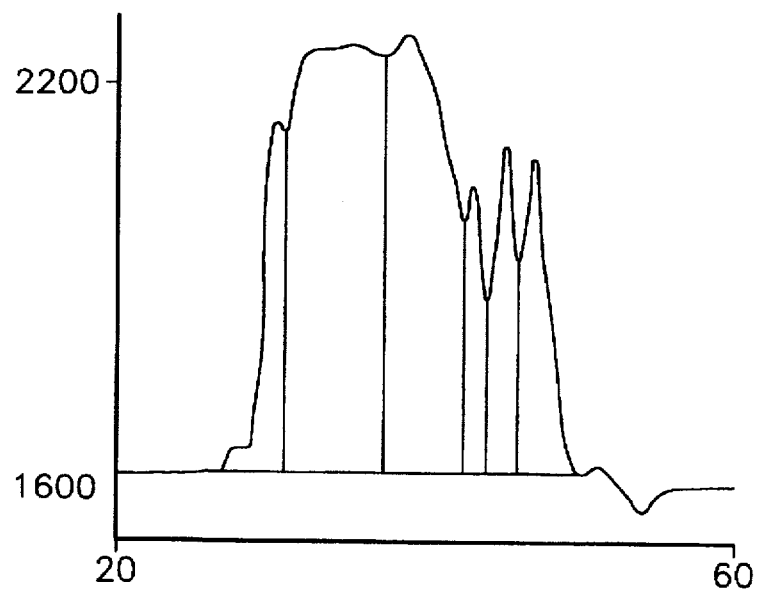
Figure 7B:
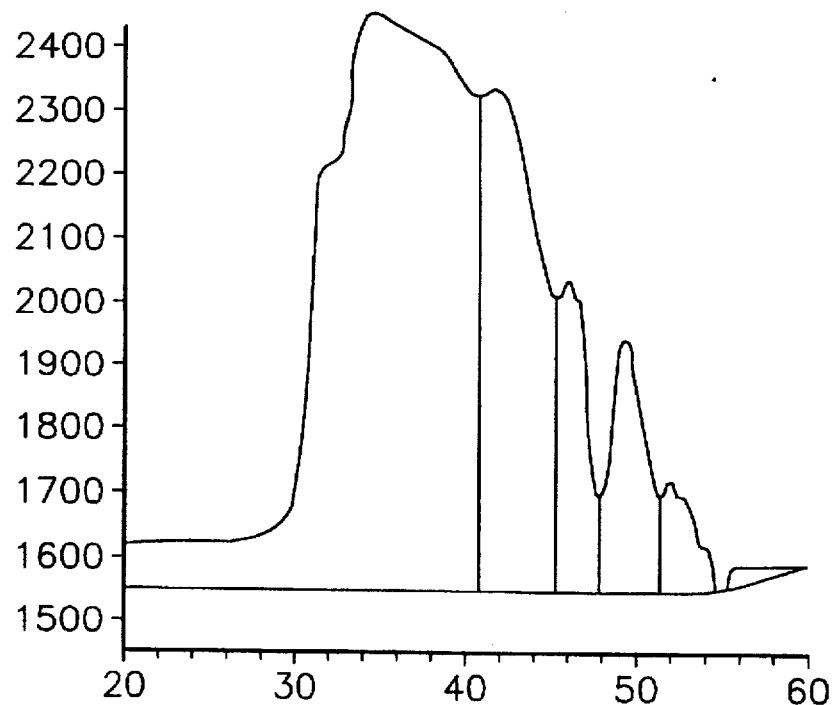
Figure 7C:
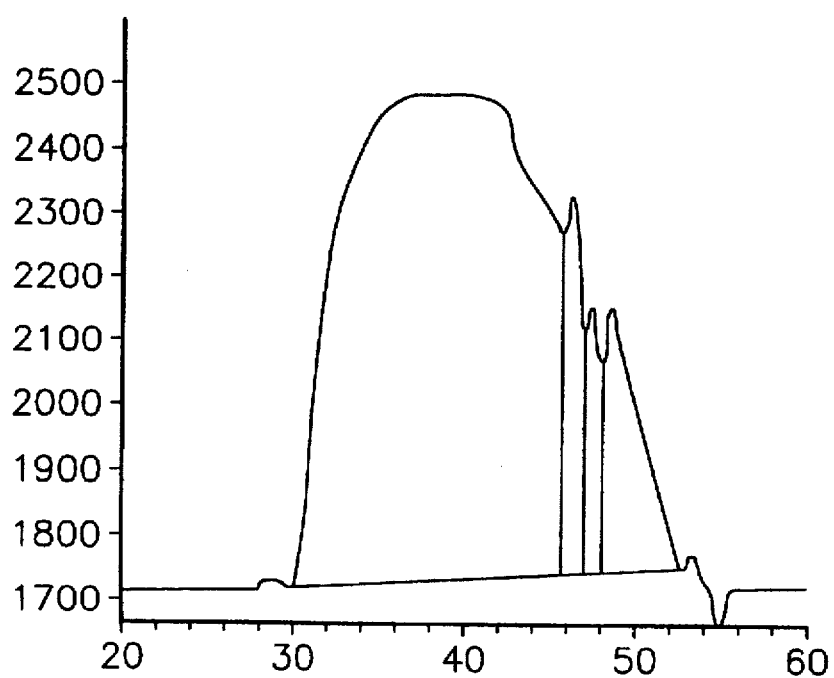

A control resin was prepared from a DCPD concentrate (DCPD 101). A second resin was prepared according to the present invention from a mixture of 96.5 parts DCPD concentrate (DCPD 101) and 3.5 parts isopropylthiol. A third resin was prepared according to the present invention from 92.4 parts DCPD concentrate (DCPD 101) and 7.6 parts isopropylthiol. The GPC trace of the control resin is shown in FIG. 7A, the GPC trace of the second resin is shown in FIG. 7B, and the GPC trace of the third resin is shown in FIG. 7C. From a comparison of FIG. 7A with FIGS. 7B and 7C, it can be seen that the addition of the alkyl thiol to the second and third resin reaction mixtures eliminated the high molecular weight shoulder that is characteristic of the control DCPD resin and resulted in a substantially unimodal molecular weight distribution. By comparing FIGS. 7B and 7C with FIG. 2B, it can also be seen that a larger amount of alkyl thiol may be required to produce the DCPD resin having an essentially unimodal molecular weight distribution than is required when using an aromatic thiol.

EXAMPLE 8

Figure 8A:
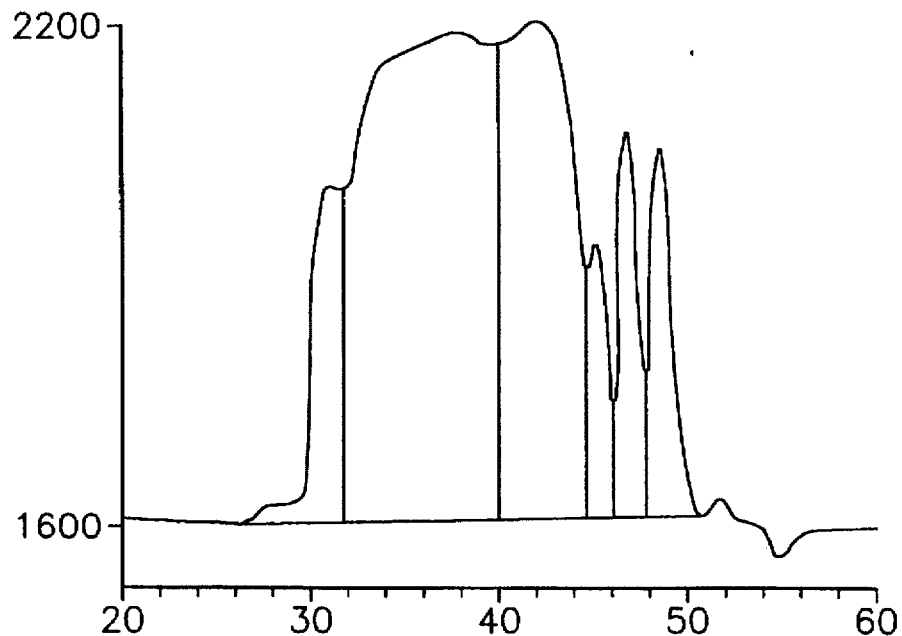
Figure 8B:
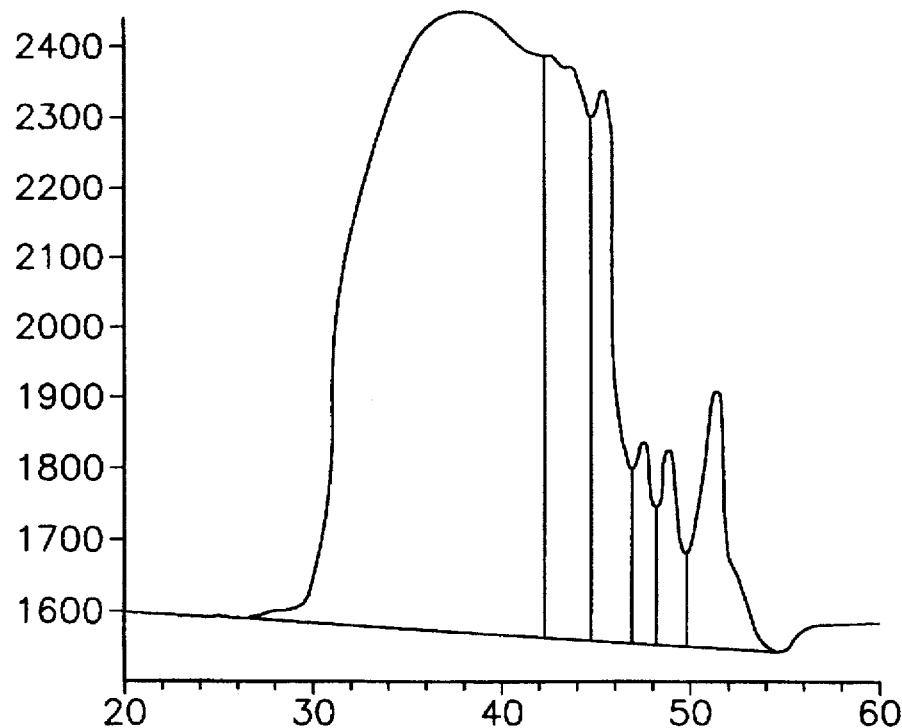
Figure 8C:
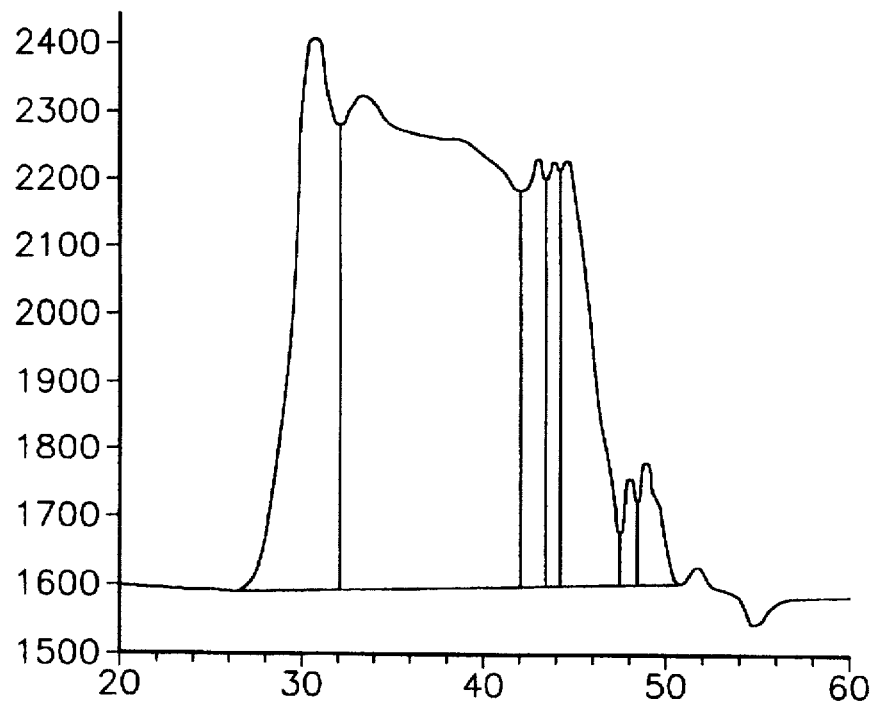
Figure 8D:
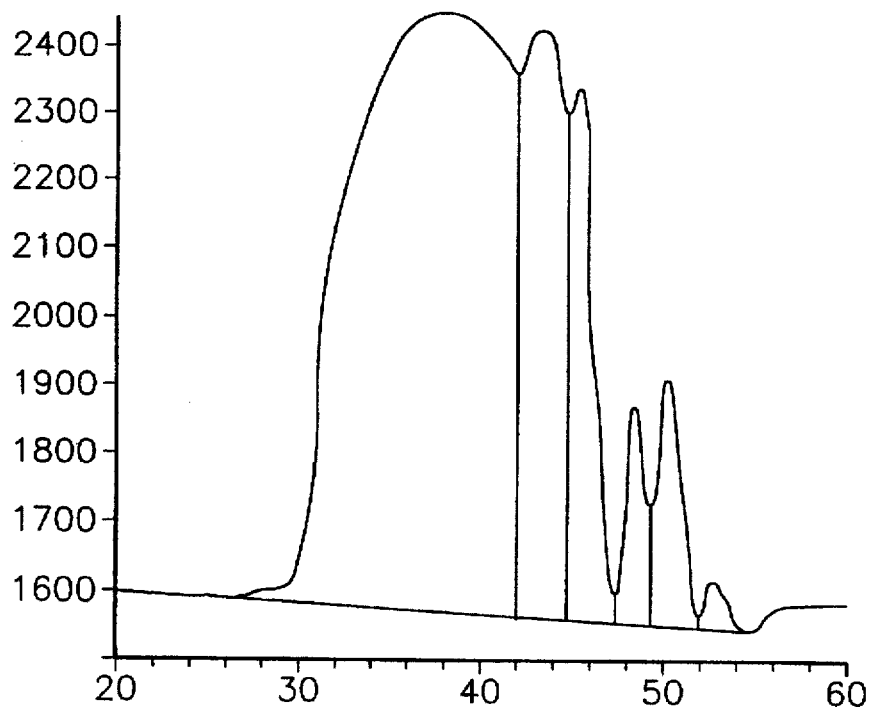

In accordance with the procedure of Example 7, a first control resin was prepared with a sample of DCPD concentrate (DCPD 101). A second resin was prepared according to the present invention from a mixture of 90 parts DCPD concentrate (DCPD 101) and 10 parts phenyldisulfide. A third resin was prepared from a mixture of 90 parts DCPD concentrate (DCPD 101) and 10 parts benzyldisulfide. A fourth resin was prepared according to the present invention from a mixture of 90 parts DCPD concentrate (DCPD 101) and 10 parts butyldisulfide. The GPC trace of the control resin is shown in FIG. 8A, the GPC trace of the second resin is shown in FIG. 8B, the GPC trace of the third resin is shown in FIG. 8C, and the GPC trace of the fourth resin is shown in FIG. 8D. From a comparison of FIG. 8A with FIGS. 8B and 8D, it can be seen that the addition of the aromatic and alkyl disulfides to the second and fourth resin reaction mixtures eliminated the high molecular weight shoulder that is characteristic of a DCPD resin produced without the use of an organic sulfur compound. Again, it can be seen that the aromatic disulfide produced a resin (FIG. 8B) which had a much better molecular weight distribution than did resin produced with the aliphatic disulfide (FIG. 8D). The addition of the benzyldisulfide to the third reaction mixture did not appear to produce any improvement in the multimodal nature of the molecular weight distribution. It is believed that the onset temperature for significant thermal disassociation of the benzyldisulfide was too low to be effective for promoting the polymerization of DCPD.

EXAMPLE 9

Figure 9A:
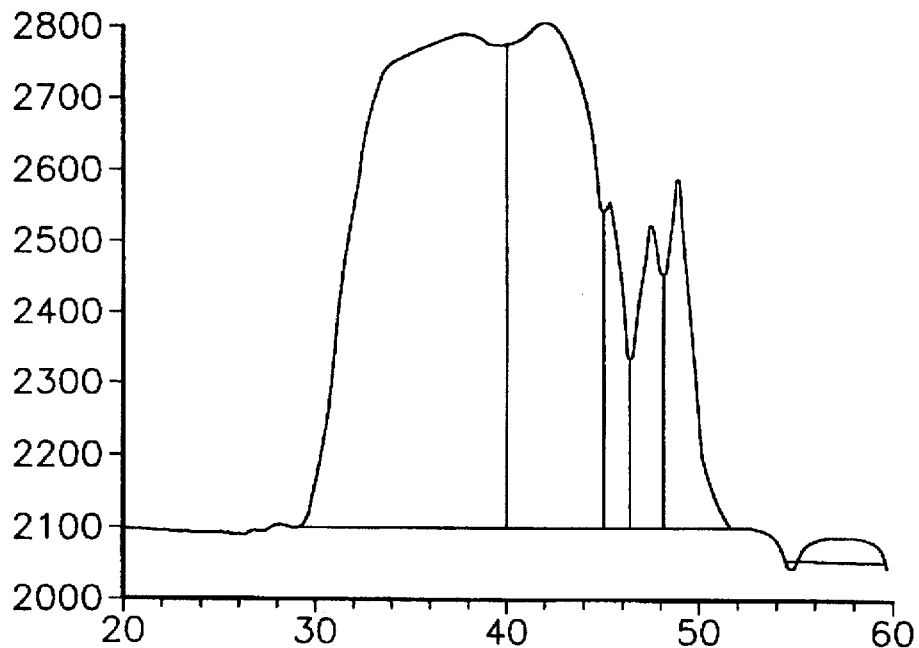
Figure 9B:
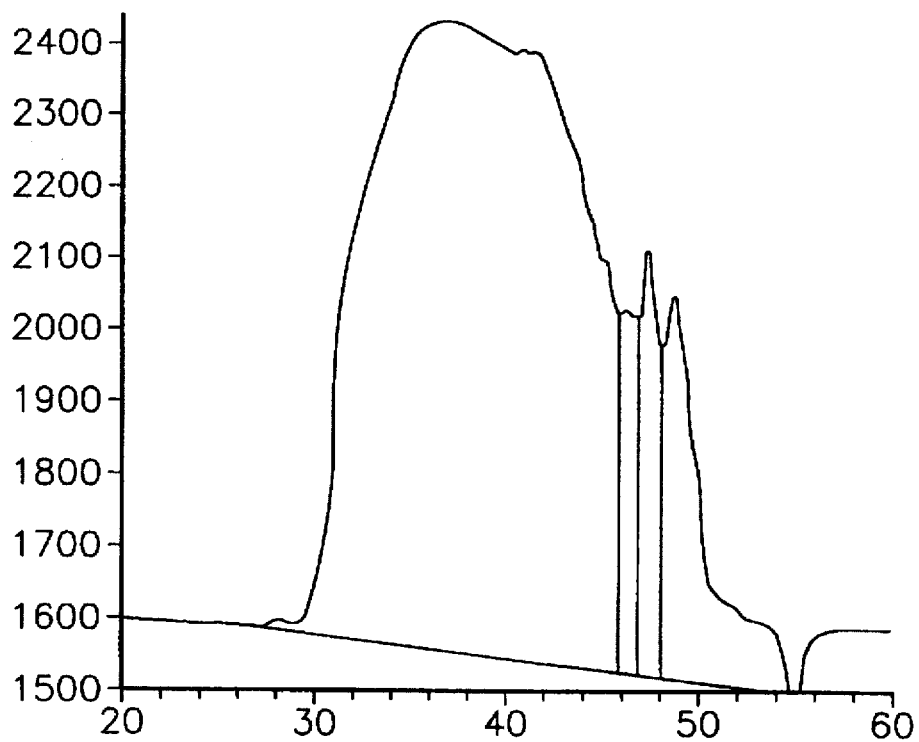

In accordance with the procedure of Example 7, a first resin was prepared from a mixture of 99 parts of a DCPD concentrate (DCPD 101) and 1 part nonylphenol disulfide oligomer (ETHANOX 323). A second resin was prepared from a mixture of 95 parts DCPD concentrate (DCPD 101) and 5 parts of a nonylphenol disulfide oligomer (ETHANOX 323). The GPC trace of the first resin is shown in FIG. 9A, and the GPC trace of the second resin is shown in FIG. 9B. As illustrated by FIGS. 9A and 9B, both DCPD resins have essentially unimodal molecular weight distributions.

The foregoing examples illustrate that the present invention provides a method for preparing thermally polymerized DCPD resins having molecular weight distributions which substantially enhance their compatibility and solubility characteristics. In addition, the formation of high molecular weight fractions in the resin products may be minimized without substantially affecting the color of the resin during polymerization.

Having described and illustrated various features of the invention, it will be recognized that variations of the invention by those of ordinary skill are within the spirit and scope of the appended claims.

What is claimed is:

1. A method for producing dicyclopentadiene resin comprising thermally polymerizing cyclopentadiene and/or dicyclopentadiene monomer in a reaction vessel at a temperature in the range of from about 240° to about 340° C. for at least about 4 hours in the presence of from about 1 to about 10 wt. % of an organic sulfur compound selected from the group consisting of disulfides, polysulfides, mercaptans, and mixtures of two or more of the foregoing which exhibit an onset of significant thermal disassociation at a temperature above about 70° C., thereby producing a resin having an essentially unimodal molecular weight distribution.

2. The method of claim 1 wherein the organic sulfur compound is selected from the group consisting of isopropyl mercaptan, thiophenol, thiosalicylic acid, 2,6-tert-butylphenol-4-thiol, phenyldisulfide, nonylphenol disulfide oligomer, di-(3,5-tert-butylphen-3-ol)disulfide, thiobis-B-naphthol, di-(3,5-tert-butylphen-3-ol)disulfide, di-(3,5-tert-butylphen-3-ol)trisulfide, and di-(3,5-tert-butylphen-3-ol)-tetrasulfide and mixtures of those organic sulfur compounds.

3. The method of claim 1 further comprising reacting the cyclopentadiene and/or dicyclopentadiene monomer in the presence of an olefinic modifier compound.

4. The method of claim 3 wherein the olefinic modifier compound is present in the range of from about 0 wt. % to about 35 wt. % based on the weight of cyclopentadiene and/or dicyclopentadiene monomer.

5. The method of claim 3 wherein the olefinic modifier compound is selected from the group consisting of ethylene, propylene, styrene, α-methyl styrene, indene, 1,3- pentadiene, isobutylene, isoprene, 1-butene, 2-methyl-2-butene, 1-pentene, 1-hexene, 1-octene, piperylene, isoprene, limonene, α-pinene, β-pinene, vinyl toluene, methyl methacrylate, acrylic acid, butadiene, and mixtures of those olefins.

6. The method of claim 1 wherein the resin has a color in the range of from about 3 to about 7 as measured by the Gardner scale.

7. The method of claim 1 further comprising reacting the dicyclopentadiene and/or cyclopentadiene monomer in the presence of acrylic acid or methyl methacrylate and esterifying the resulting dicyclopentadiene resin with a polyol.

8. The method of claim 7 wherein at least a portion of the water formed during the esterification step is retained in the vessel during the esterification step to limit the extent of esterification.

9. A method for polymerizing cyclopentadiene and/or dicyclopentadiene monomer to produce a dicyclopentadiene resin, the method comprising mixing from about 90 to about 99 wt. % cyclopentadiene and/or dicyclopentadiene monomer with from about 1 to about 10 wt. % of an organic sulfur compound selected from the group consisting of disulfides, polysulfides, mercaptans, and mixtures of two or more of the foregoing which exhibit an onset of significant thermal disassociation at a temperature above about 70° C. to provide a reaction mixture, placing the reaction mixture in a reaction vessel capable of being sealed and pressurized, and heating the reaction mixture to a temperature in the range of from about 240° to about 340° C. for a period of time sufficient to thermally polymerize essentially all of the cyclopentadiene and/or dicyclopentadiene monomer, wherein the resulting dicyclopentadiene resin has an essentially unimodal molecular weight distribution.

10. The method of claim 9 wherein the organic sulfur compound is selected from the group consisting of isopropyl mercaptan, thiophenol, thiosalicylic acid, 2,6-tert-butylphenol-4-thiol, phenyldisulfide, nonylphenol disulfide oligomer, di-(3,5-tert-butylphen-3-ol)disulfide, thiobis-β-naphthol, di-(3,5-tert-butylphen-3-ol)disulfide, di-(3,5-tert-butylphen-3-ol)trisulfide, and di-(3,5-tert-butylphen-3-ol)-tetrasulfide and mixtures of those organic sulfur compounds.

11. The method of claim 9 wherein the reaction mixture further comprises an olefinic modifier compound.

12. The method of claim 11 wherein the olefinic modifier compound is present in the range of from about 0 wt. % to about 35 wt. % based on the total weight of the reaction mixture.

13. The method of claim 11 wherein the olefinic modifier compound is selected from the group consisting of ethylene, propylene, styrene, α-methyl styrene, indene, 1,3-pentadiene, isobutylene, isoprene, 1-butene, 2-methyl-2-butene, 1-pentene, 1-hexene, 1-octene, piperylene, isoprene, limonene, α-pinene, β-pinene, vinyl toluene, methyl methacrylate, acrylic acid, butadiene, and mixtures of those olefins.

14. The method of claim 9 wherein the resin has a color in the range of from about 3 to about 7 as measured by the Gardner scale.

15. The method of claim 9 further comprising reacting the dicyclopentadiene and/or cyclopentadiene monomer in the presence of acrylic acid or methyl methacrylate and esterifying the resulting dicyclopentadiene resin with a polyol.

16. The method of claim 15 wherein at least a portion of the water formed during the esterification step is retained in the vessel during the esterification step to limit the extent of esterification.

* * * * *

UNITED STATES PATENT AND TRADEMARK OFFICE
CERTIFICATE OF CORRECTION

PATENT NO. : 5,693,731

DATED : December 2, 1997

INVENTOR(S) : Theodore J. Williams and John J. Schmid

It is certified that error appears in the above-indentified patent and that said Letters Patent is hereby corrected as shown below:

Column 1, line 1, after "continuation-in-part" insert -- copending --.

Column 10, line 54, delete "thiobis-B-" and insert -- thiobis-β --.

Signed and Sealed this

Seventeenth Day of February, 1998

Attest:

BRUCE LEHMAN

Attesting Officer

Commissioner of Patents and Trademarks